(12) United States Patent
Piel

(10) Patent No.: US 12,260,244 B2
(45) Date of Patent: Mar. 25, 2025

(54) DEVICE AND METHOD FOR MANAGING COMMUNICATION VIA INTERFACES IN A VIRTUALIZED SYSTEM

(71) Applicant: Robert Bosch GmbH, Stuttgart (DE)

(72) Inventor: Gunnar Piel, Shanghai (CN)

(73) Assignee: ROBERT BOSCH GMBH, Stuttgart (DE)

( * ) Notice: Subject to any disclaimer, the term of this patent is extended or adjusted under 35 U.S.C. 154(b) by 427 days.

(21) Appl. No.: 17/704,359

(22) Filed: Mar. 25, 2022

(65) Prior Publication Data

US 2022/0318047 A1   Oct. 6, 2022

(30) Foreign Application Priority Data

Apr. 1, 2021   (DE) .................. 10 2021 203 329.6

(51) Int. Cl.
*G06F 9/455* (2018.01)
*G06F 21/64* (2013.01)
*H04W 88/16* (2009.01)

(52) U.S. Cl.
CPC .......... *G06F 9/45558* (2013.01); *G06F 21/64* (2013.01); *G06F 2009/45587* (2013.01); *G06F 2009/45595* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 9,268,698 B1* | 2/2016 | Lunev | ................... | G06F 3/0668 |
| 2010/0217916 A1* | 8/2010 | Gao | ..................... | G06F 12/109 |
| | | | | 718/1 |
| 2013/0159614 A1* | 6/2013 | Anand | ................ | G06F 9/45558 |
| | | | | 711/104 |
| 2013/0160012 A1* | 6/2013 | Ganguly | ............. | G06F 9/45533 |
| | | | | 718/1 |
| 2017/0371698 A1* | 12/2017 | Paolino | ................... | H04L 49/70 |
| 2019/0370131 A1* | 12/2019 | Mishra | .................... | G06F 9/544 |

FOREIGN PATENT DOCUMENTS

| | | | |
|---|---|---|---|
| DE | 102012215765 A1 | | 5/2014 |
| DE | 102015206196 A1 | | 10/2016 |
| DE | 102016223341 A1 | | 5/2018 |
| EP | 3167593 A1 | | 5/2017 |
| EP | 3281106 A1 | | 2/2018 |
| WO | WO 2011078861 A1 * | 6/2011 | ............. H04L 69/12 |
| WO | WO 2012024508 A2 * | 2/2012 | ............. G06F 21/60 |
| WO | WO 2016162144 A1 * | 10/2016 | ......... G06F 9/45558 |

* cited by examiner

*Primary Examiner* — Charles E Anya
(74) *Attorney, Agent, or Firm* — NORTON ROSE FULBRIGHT US LLP; Gerard A. Messina

(57) ABSTRACT

A device for managing communication via interfaces in a virtualized system in which a plurality of virtual machines shares a hardware platform which is virtualized with the aid of a hypervisor, and interfaces assigned to the hardware platform access to the interfaces taking place with the aid of a gateway implemented in hardware. A method for operating the device is also described.

9 Claims, 2 Drawing Sheets

DEVICE AND METHOD FOR MANAGING COMMUNICATION VIA INTERFACES IN A VIRTUALIZED SYSTEM

FIELD

The present invention relates to a device and to a method for operating a device for managing communication via interfaces in an electronic system in which a plurality of virtual machines shares a hardware platform, which is virtualized with the aid of a hypervisor, and interfaces assigned to the hardware platform.

BACKGROUND INFORMATION

Electronic systems are being increasingly virtualized for multiple independent so-called software guests with the aid of a so-called hypervisor, which is also known as a virtual machine monitor (VMM). Each software guest has access to a so-called subset referred to as a virtual machine (VM) and to a partition of the underlying hardware, which means that the software guest runs in the virtual machine. The software guests and virtual machines share a shared hardware platform and its resources, for example, their interfaces. Of particular significance in such systems is the maximum mutual independence and uninfluenceability of the virtual machines. This is increasingly supported in the processors on the part of the semiconductor manufacturers by so-called hardware virtualization extensions, i.e., operations already present in the hardware, which support this mode. This hardware-side support is essentially confined to the processor cores, i.e., the CPUs and the memory management, specific memory partitions usually being assigned to the virtual machines.

Interfaces, in particular automotive interfaces such as, for example, CAN, Flexray, or LIN, are usually managed by a software, which runs on the VM or the VMM, a shared utilization of the particular interfaces being thereby enabled at run time. These functions result in an overhead, which is not irrelevant, however, and comes at the expense of the performance of the VMM or the virtual machines and results in a mutual temporal influence of the virtual machines and, by means of which, processing power is extracted from the actual applications of the virtual machines.

Due to the mutual influence of the virtual machines during shared utilization of interfaces, furthermore, risks result with respect to the safety and security for the data transfer and processing in the virtual machines.

SUMMARY

An object of the present invention is to configure a communication via the shared interfaces in a virtualized system in such a way that the possible effects of gaps in safety and security is reduced or avoided.

This object may be achieved by a device in accordance with the present invention.

One specific example embodiment of the present invention relates to a device for managing communication via interfaces in a virtualized system in which a plurality of virtual machines shares a hardware platform, which is virtualized with the aid of a hypervisor, and interfaces assigned to the hardware platform, access to the interfaces taking place with the aid of a gateway implemented in hardware, the gateway including an interface, which enables a direct writing and reading of data, which have been received or are to be transferred, into the particular memory partitions of a processor or processor system, and a safety module implemented in hardware and a security module implemented in hardware, the safety module being configured for carrying out at least one function for ensuring the validity of the data, and the security module being configured for carrying out at least one function for ensuring data security.

Due to the utilization of a gateway implemented in hardware, the overhead usually generated by software is eliminated. Such a gateway module is described, for example, in German Patent Application No. DE 10 2012 215 765 A1. This gateway module includes a configurable hardware circuit which is configured for processing and forwarding data from one subnetwork to another subnetwork under consideration of the different communication protocols, so that, in particular, the interfaces, for example, the communication interfaces, are therefore managed in such a way that they may be jointly utilized by the virtual machines. As a result, software mechanisms in the hypervisor or the virtual machine monitor and in the virtual machines, which are necessary for the joint utilization of interfaces, become superfluous. The hardware-based gateway described in German Patent Application No. DE 10 2012 215 765 A1 was originally developed for different automotive interfaces such as, for example, CAN, LIN, Flexray, and Ethernet. According to European Patent No. EP 3 281 106 A1, such a gateway is supplemented by one further interface. This additional interface permits the direct writing of data into the memory of a processor system, which is referred to as a so-called DMA (Direct Memory Access) transfer. Due to the direct access to the memory of the processor(s), the gateway is capable of writing the payload or the data of the interfaces (CAN, Flexray, LIN, Ethernet, . . . ) to be managed directly into the particular memory partitions of the virtual machines or reading the payload or the data of the interfaces (CAN, Flexray, LIN, Ethernet, . . . ) to be managed directly out of the particular memory partitions of the virtual machines. The gateway includes a pipeline approach or is, for example, implemented based on a pipeline approach. The pipeline includes multiple hardware function modules. In particular, modules are available for handling communication protocols. Within the scope of the present invention, two new modules are added to the pipeline. One of the modules processes safety mechanisms and the other module processes security mechanisms. The present invention supplements the conventional gateway by safety and security mechanisms for the jointly utilized communication interfaces.

The present invention permits the carrying-out of safety measures such as, for example, an end-to-end protection of the data streams in hardware. In addition, security measures may also be implemented in hardware. Security measures include, in particular, measures for ensuring data integrity, in particular with the aid of signatures, confidentiality, in particular with the aid of encryption and decryption, and protection against unauthorized accesses and data content, in particular with the aid of firewalling.

The present invention permits an increase in performance by displacement of the data stream into hardware. This results in minor latencies and high bandwidths. Due to the shift into hardware, considerable portions of the processing power are freed up for carrying out application software. As a result, costs may be reduced, in particular due to the utilization of more favorable processing cores, power loss may be reduced, and comprehensive protective measures may be implemented.

The data access is confined to the involved units depending on the purpose, a subdivision into security and safety mechanisms taking place due to the division into a security module and a safety module.

The validity of the data in the hardware may be ensured with the aid of the safety module. In particular, it may be ensured in this way that only valid data are transferred. Transfer errors may be recognized. It is important, in particular, to ensure the integrity of the data.

According to one specific example embodiment of the present invention, it is provided that the safety module is configured for ensuring the integrity of the data with the aid of checksums and/or by utilizing a linear counter. The safety module calculates and transfers a checksum together with the data to be transferred. Upon receipt of data, the safety module calculates a checksum and compares the calculated checksum with a checksum transferred with the data. If the checksums match, the integrity is ensured. The integration of linear counters into the data makes it possible to recognize an outage of data, in particular of complete messages. Outages are detected due to gaps in the counter content. The checksum calculation requires a lot of processing power, which increases with the data rate and volume. Due to the shift of the checksum calculation into hardware, portions of the processing power may be kept free for carrying out application software.

Generally speaking, various attack vectors may be recognized and repelled with the aid of the security module. In principle, the security is to be ensured on the basis of protected and encrypted data. On the one hand, the integrity of the data may be established on the basis of signatures. Signatures may be utilized in parallel and similarly to the checksums of the safety module. Moreover, data protection and authenticity may be ensured on the basis of encryption and firewall mechanisms.

According to one specific example embodiment of the present invention, it is provided that the security module: is configured for carrying out encryption and/or decryption operations and/or authentication operations on the data to be transferred and/or to be received. Advantageously, the security module cryptographically encrypts data to be transferred. Received data are decrypted by the security module. Encryption and/or decryption operations require a high processing power, which increases with the data rate and volume. Due to the shift of the encryption and/or decryption operations into hardware, portions of the processing power may be kept free for carrying out application software.

According to one specific example embodiment of the present invention, it is provided that the security module includes a firewall. The utilization of a firewall makes it possible to check the communication behavior and data content for unauthorized patterns. For example, the security module is designed for deciding, on the basis of established rules, whether received data are transferred to the memory partitions, or not. Advantageously, unauthorized accesses to the network are prevented in this way. In principle, firewalling operations likewise require a high processing power for the analysis, which increases with data rate and volume. Due to the shift of the firewalling operations into hardware, portions of the processing power may be kept free for carrying out application software.

Further specific example embodiments of the present invention relate to a method for operating a device according to the described specific example embodiments of the present invention, the access to the interfaces taking place with the aid of the gateway implemented in hardware, and data received or to be transferred with the aid of the interface are written and/or read directly into the particular memory partitions of a processor or processor system, and the safety module carrying out at least one function for ensuring the validity of the data and the security module carrying out at least one function for ensuring data security.

According to one advantageous specific example embodiment of the present invention, it is provided that data received via an interface are processed initially by the security module and subsequently by the safety module and, thereafter, are written directly into the particular memory partitions of a processor or processor system with the aid of the interface of the gateway and/or data to be transferred via an interface are initially read directly out of the particular memory partitions of a processor or processor system with the aid of the interface of the gateway and, thereafter, processed initially by the safety module and subsequently by the security module. Due to the predefined sequence, it suffices when the safety module meets requirements according to the ASIL standard ISO 26262, in order to ensure the functional reliability of the system in a motor vehicle.

According to one specific example embodiment of the present invention, it is provided that the safety module ensures the integrity of the data with the aid of checksums.

According to one specific example embodiment of the present invention, it is alternatively or additionally provided that the safety module ensures the integrity of the data with the aid of a linear counter.

According to one specific example embodiment of the present invention, it is provided that the security module carries out encryption and/or decryption operations and/or authentication operations on the data to be transferred and/or to be received.

According to one specific example embodiment of the present invention, it is alternatively or additionally provided that the security module checks the data to be transferred and/or to be received on the basis of established rules and the data are blocked or forwarded as a function of the check.

Further features, possible applications, and advantages of the present invention result from the following description of exemplary embodiments of the present invention, which are represented in the figures. In this case, all described or represented features, either alone or in arbitrary combination, are the subject matter of the present invention, regardless of their wording or representation in the description or in the figures.

DETAILED DESCRIPTION OF EXAMPLE EMBODIMENTS

Figure 1:
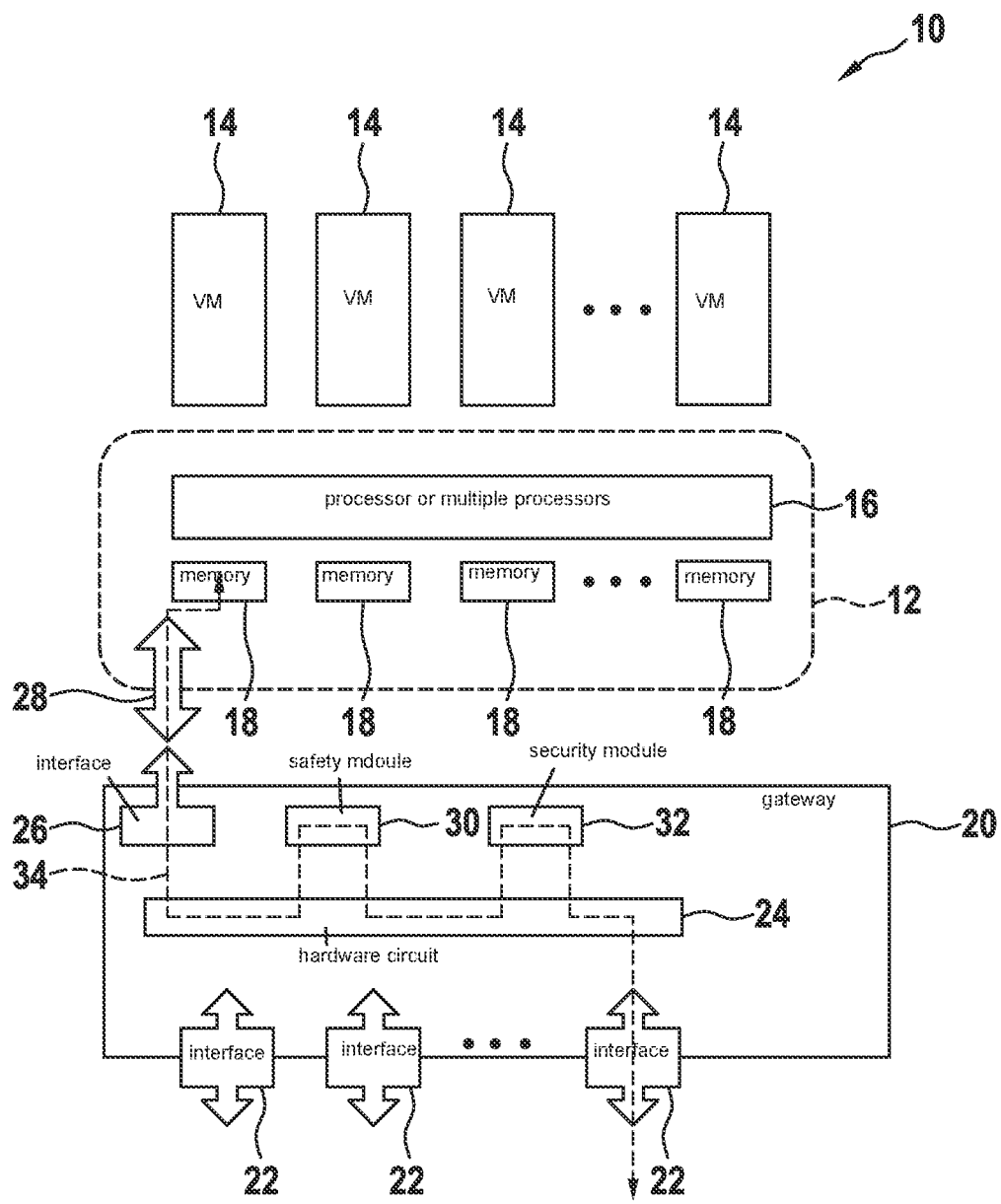
FIG. 1 shows a schematic representation of a virtualized system including a device for managing communication via interfaces in a virtualized system according to a first preferred specific example embodiment of the present invention.

In FIG. 1, a virtualized system 10 is represented, which includes a hypervisor 12, which is also referred to as a virtual machine monitor (VMM), and multiple independent virtual machines 14 (VM). Virtual machines 14 share a hardware platform 16, 18 virtualized with the aid of hypervisor 12 and interfaces 22 assigned to hardware platform 16, 18.

Hypervisor 12 creates an abstraction layer, so that an actually present processor or multiple present processors 16 as well as associated memory or memories 18 present themselves to each virtual machine 14 as if particular virtual machine 14 alone includes processor(s) 16 and memory or memories 18.

In FIG. 1, a gateway 20 is also represented, which includes a hardware circuit 24 in which the gateway core functions are implemented.

Gateway 20 manages the access to multiple interfaces 22 or communication interfaces, which are designed, for example, as interfaces to subnetworks, which operate, for example, according to different protocols (LIN, Flexray, CAN, Ethernet, . . . ). Consequently, the communication between virtual machines 14 and interfaces 22 is regulated by gateway 20.

Gateway 20 represented in FIG. 1 also includes an interface 26, which is designed, for example, as a DMA interface, and enables a direct access to memory areas 18. Due to interface 26 designed as a DMA interface, data may therefore be written directly into memory areas 18 and read directly on these memory areas 18. PCIe connection 28, which is made available by present-day processor systems, is preferably utilized for this purpose.

According to the specific embodiment shown in FIG. 1, gateway 20 includes a safety module 30 and a security module 32.

Safety module 30 is utilized, in particular, for ensuring the validity of the data. In particular, it may be ensured in this way that only valid data are transferred. Transfer errors may be recognized. It is important, in particular, to ensure the integrity of the data.

According to one specific embodiment, it is provided that safety module 30 is configured for ensuring the integrity of the data with the aid of checksums and/or by utilizing a linear counter. Safety module 30 calculates and transfers a checksum together with the data to be transferred. Upon receipt of data, safety module 30 calculates a checksum and compares the calculated checksum with a checksum transferred with the data. If the checksums match, the integrity is ensured. The integration of linear counters into the data makes it possible to recognize an outage of data, in particular of complete messages. Outages are detected due to gaps in the counter content.

Security module 32 is utilized, in particular, for recognizing and repelling various attack vectors. In principle, the security is to be ensured on the basis of protected and encrypted data with the aid of security module 32. On the one hand, the integrity of the data may be established on the basis of signatures. Signatures may be utilized in parallel and similarly to the checksums of the safety module. Moreover, data protection and authenticity may be ensured on the basis of encryption and firewall mechanisms.

According to one specific example embodiment of the present invention, it is provided that security module 32 is configured to carry out encryption and/or decryption operations and/or authentication operations on the data to be transferred and/or to be received. Advantageously, security module 32 cryptographically encrypts data to be transferred. Received data are decrypted by the security module.

According to one specific example embodiment, it is provided that security module 32 includes a firewall. The utilization of a firewall makes it possible to check the communication behavior and data content for unauthorized patterns. For example, security module 32 is designed for deciding, on the basis of established rules, whether received data are transferred to the memory partitions, or not. Advantageously, unauthorized accesses to the network are prevented in this way.

In FIG. 1, an exemplary data stream is indicated by dashed line 34. The data stream is explained in detail with reference to FIGS. 2A and 2B.

Figure 2A:
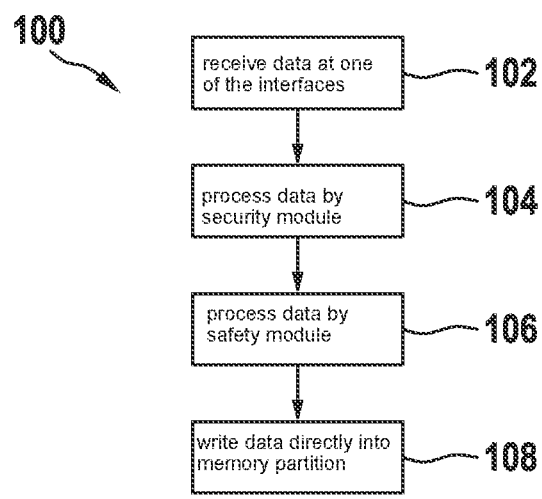
FIGS. 2A and 2B show aspects of a method for operating a device according to FIG. 1, in accordance with an example embodiment of the present invention.
Figure 2B:
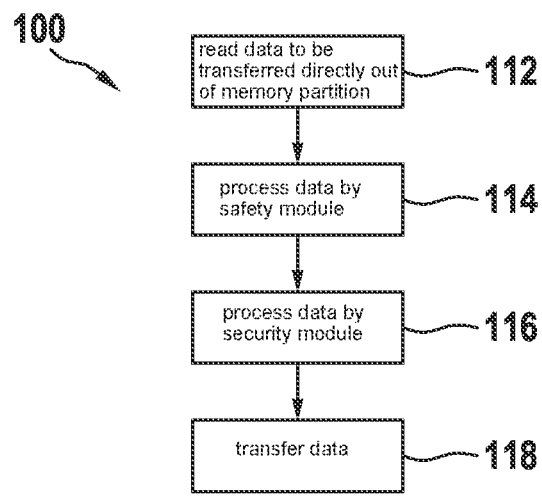

FIGS. 2A and 2B represent schematic steps of a method 100 for operating device 20 in a system 10 from FIG. 1.

According to FIG. 2A, in a step 102, data are received at one of interfaces 22. The data are then initially processed by security module 32 in a step 104 and subsequently processed by safety module 30 in a step 106. Thereafter, in a step 108, the data are written directly into a memory partition 18 with the aid of interface 26 of gateway 20.

In step 104, firewalling and decryption operations are carried out, for example, by security module 32.

In step 106, a checksum is calculated and compared with a checksum transferred with the data, for example, by safety module 30. In addition, a linear counter may be integrated into safety module 30. Upon receipt of data, the counter content is, for example, incremented.

According to FIG. 2B, in a step 112, data to be transferred are initially read directly out of a memory partition 18 with the aid of interface 26 of gateway 20. The data are then initially processed by safety module 30 in a step 114 and subsequently processed by security module 32 in a step 116. Thereafter, in a step 118, the data are transferred via one of interfaces 22.

In step 114, a checksum is calculated and forwarded together with the data to be transferred, for example, by safety module 30. In addition, a linear counter may be integrated into safety module 30. Upon sending of data, the counter content is, for example, incremented.

In step 116, encryption operations are carried out, for example, by security module 32.

Due to the sequence predefined according to the described specific embodiment, it suffices when safety module 30 meets the requirements according to the ASIL standard ISO 26262, in order to ensure the functional reliability of the system in a motor vehicle.

Device 20 may be advantageously utilized in a control system of a motor vehicle, in particular including a number of automotive control units. The control units are, for example, vehicle computers, domain/cross-domain ECUs, zone ECUs, and gateways. The aforementioned control units include, for example, communication interfaces, in particular automotive interfaces, such as, for example, CAN, Flexray, or LIN.

What is claimed is:

1. A device for managing communication via interfaces in a virtualized system in which a plurality of virtual machines shares a hardware platform which is virtualized using a hypervisor, and interfaces assigned to the hardware platform, the device comprising:
 a gateway implemented in hardware, access to the interfaces by the virtual machines taking place using the gateway, the gateway including an interface which enables a direct writing and reading of data, which have been received or are to be transferred, into memory partitions of a processor or processor system, a safety module implemented in hardware, and a security module implemented in hardware, the safety module being configured to carry out at least one function for ensuring validity of the data, and the security module being configured to carry out at least one function for ensuring data security;

wherein the gateway is configured such that: (i) data received via the interface are processed initially by the security module and subsequently by the safety module, and, thereafter, are written directly into the memory partitions of the processor or processor system using the interface of the gateway and/or (ii) data to be transferred via the interface are initially read directly out of the memory partitions of the processor or processor system using the interface of the gateway and, thereafter, processed initially by the safety module and subsequently by the security module.

2. The device as recited in claim 1, wherein the safety module is configured to ensure integrity of the data using checksums and/or by utilizing a linear counter.

3. The device as recited in claim 1, wherein the security module is configured to carry out encryption and/or decryption operations and/or authentication operations on the data to be transferred and/or to be received.

4. The device as recited in claim 1, wherein the security module includes a firewall.

5. A method for operating a device for managing communication via interfaces in a virtualized system in which a plurality of virtual machines shares a hardware platform which is virtualized using a hypervisor, and interfaces assigned to the hardware platform, the device including: a gateway implemented in hardware, access to the interfaces by the virtual machines taking place using the gateway, the gateway including an interface which enables a direct writing and reading of data, which have been received or are to be transferred, into memory partitions of a processor or processor system, a safety module implemented in hardware, and a security module implemented in hardware, the safety module being configured to carry out at least one function for ensuring validity of the data, and the security module being configured to carry out at least one function for ensuring data security, the method comprising:

accessing by the virtual machines the interfaces using the gateway implemented in hardware; and writing directly into or reading directly memory partitions of the processor or processor system, data received or to be transferred, using the interface of the gateway, the safety module carrying out at least one function for ensuring the validity of the data and the security module carrying out at least one function for ensuring data security;

wherein: (i) data received via an interface of the interfaces are processed initially by the security module and subsequently by the safety module, and, thereafter, are written directly into the memory partitions of the processor or processor system using the interface of the gateway and/or (ii) data to be transferred via an interface of the interfaces are initially read directly out of the memory partitions of the processor or processor system using the interface of the gateway and, thereafter, processed initially by the safety module and subsequently by the security module.

6. The method as recited in claim 5, wherein the safety module ensures the integrity of the data using checksums.

7. The method as recited in claim 5, wherein the safety module ensures the integrity of the data using a linear counter.

8. The method as recited in claim 5, wherein the security module carries out encryption and/or decryption operations and/or authentication operations on the data to be transferred and/or to be received.

9. The method as recited in claim 5, wherein the security module checks the data to be transferred and/or to be received based on established rules and the data are blocked or forwarded as a function of the check.

* * * * *